March 24, 1953 A. NYMAN 2,632,810
FACSIMILE FRAMING SYSTEM
Filed Feb. 2, 1951
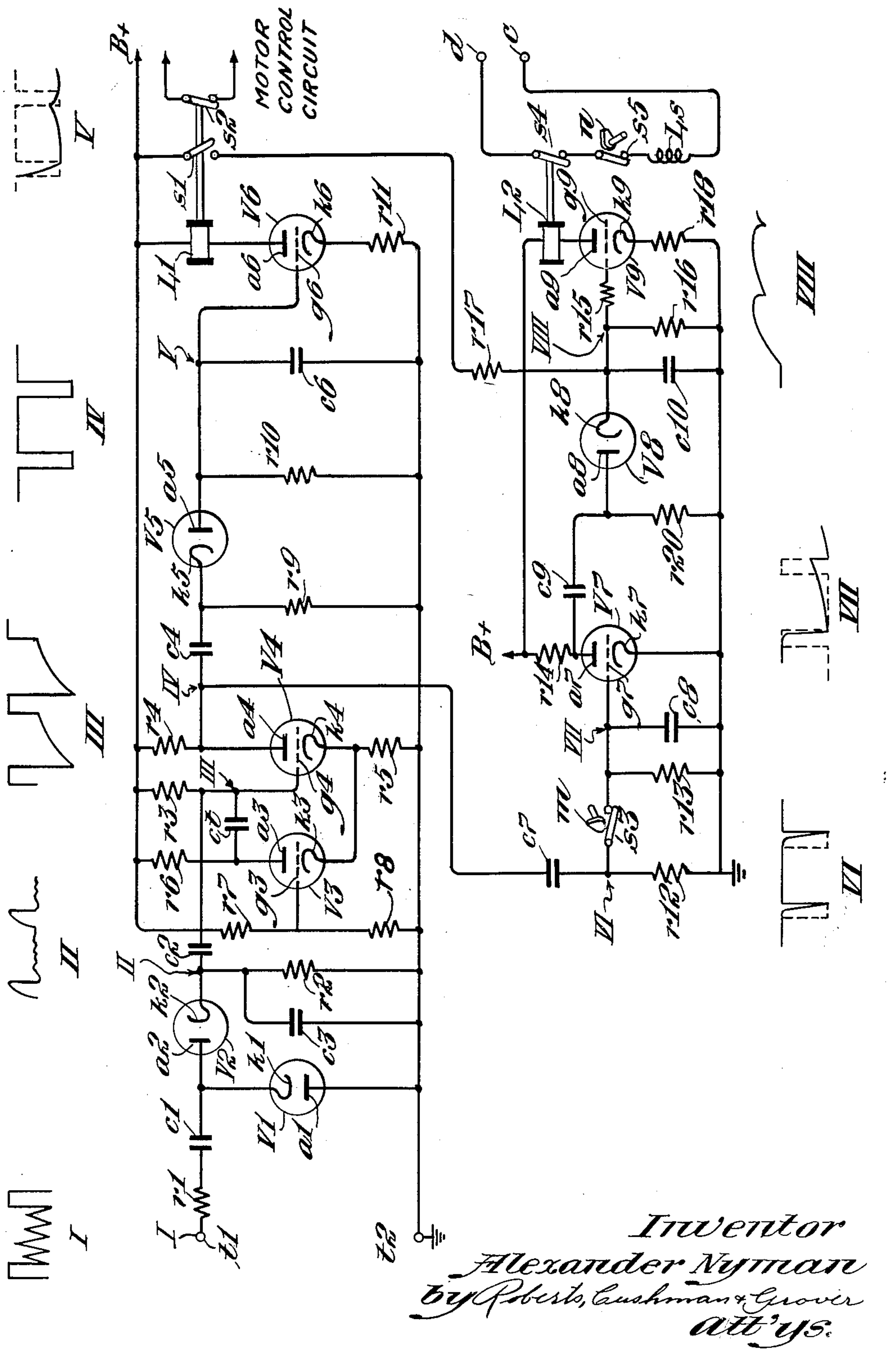
Inventor
Alexander Nyman
by Roberts, Cushman & Grover
Att'ys.

Patented Mar. 24, 1953 2,632,810

UNITED STATES PATENT OFFICE 2,632,810

FACSIMILE FRAMING SYSTEM

Alexander Nyman, Dover, Mass., assignor to Alden Products Co., Brockton, Mass., a corporation of Massachusetts Application February 2, 1951, Serial No. 209,103

14 Claims. (Cl. 178—69.5)

In facsimile it is necessary not only that the moving electrode of the receiving apparatus be in synchronism with the scanner of the transmitting apparatus, but these elements must be framed, i. e. their mechanical phase relationship must be such that as the scanning spot starts across a new scanning line, the effective recording spot of the moving electrode must be simultaneously starting across a corresponding line upon the recording medium. Early slow speed systems were phased manually by observation of the copy, but with increases in speed it was found necessary to introduce a phasing signal which usually consists of a pulse equal or greater in amplitude than the greatest marking signal level which is transmitted for approximately 15 degrees of the total of each scanning cycle.

Several automatic phasing systems have been developed, which are operated by the input signal pulses to frame the receiver with respect to the transmitter. These various systems have depended upon friction clutches, latches, slipping of poles of the driving motor and the use of an auxiliary phasing motor. The simpler systems employing mechanical devices have been characterized by requiring that the recorder be operating at the start of the transmission. The more complicated electrical systems have generally been found to be expensive and subject to erroneous slippage.

Accordingly the objects of this invention are to provide framing apparatus which will bring the recorder of a facsimile system into proper phase with the scanner, which is completely automatic in operation, which will start the recorder at the beginning of a transmission period, which will stop both the operating motor and the framing device of the recorder at the termination of a transmission period, which will bring the recorder into proper phase relationship during the transmission after a loss of phase due to either electrical or mechanical interference, which is rapid and positive in operation, which is not subject to slippage, which requires a minimum of maintenance, and which advances the art generally.

In a broad aspect the invention contemplates apparatus such as an electrical circuit for operating phase control apparatus, for example the framing device for the drum or other moving electrode of facsimile apparatus. The apparatus comprises circuit means for applying the framing pulses of an input signal to a generator of auxiliary pulses, such as a one shot multivibrator, thereby to synchronize the frequency of the auxiliary pulses with that of framing pulses, and a network interconnecting the output of the multivibrator with actuating means for the framing device. The network includes switching means which are operated in synchronism with movement of the facsimile receiver electrode. These switching means apply the auxiliary pulses to the framing device actuating means when the successive operations of the switching means coincide with the occurrence of the auxiliary pulses. This coincidence corresponds to the desired phase relationship or framing of the record. The time constant of the network is preferably long enough with respect to the period of the auxiliary pulses so that a substantially constant potential is impressed upon the actuating means thereby to render the framing device inoperative upon the occurrence of the required phase relationship between the scanner and receiver.

In a further aspect the generator of the auxiliary pulses is a one kick or single shot multivibrator which is preferably although not necessarily of the cathode coupled type including two vacuum tubes each of which has at least an anode, a cathode and a control electrode. The cathodes of both tubes are connected to ground by means of a common cathode biasing resistor. The frequency of operation of this multivibrator depends upon the frequency of the input signal framing pulses so that the rates of the framing and auxiliary pulses are in synchronism.

In a specific aspect the substantially constant potential obtained from the network is applied either directly or by means of an amplifier to a circuit interrupting device such as a relay in the actuating circuit for the framing device which is preferably although not necessarily a step coupling such as is shown in the copending application of Edward D. Cross, Serial No. 173,726, filed July 14, 1950, interposed between the electrode carrying drum and the driving motor of a conventional helical facsimile recorder. The coupling is provided with a solenoid which is connected in the actuating circuit so that each time the solenoid is energized or deenergized the angular relationship between the motor and drum is changed. The actuating circuit also includes a switch which is operated periodically for example by the rotation of the recorder drum to operate the step coupling thereby successively to change the relative angular relationship between the drum and the motor until the actuating circuit is opened by the operation of the circuit interrupting device by the potential from the network which results from the synchronization of the operation of the network switching means and the occurrence of the auxiliary pulses.

In another broad aspect the invention includes a control circuit for the drum operating motor which is interconnected with the network to render the framing device inoperative, for example by energizing the circuit interrupting device, when the absence of auxiliary pulses from the generator results in deenergization of the drum motor thereby to prevent the operation of the framing device during the absence of an input signal.

These and other objects and aspects of the invention will be apparent from the following description of a specific embodiment referring to a drawing wherein the single figure is that of a wiring diagram.

The particular embodiment of the invention chosen for purposes of illustration comprises a pair of input terminals *t1* and *t2* the latter of which is connected to ground. The terminal *t1* is connected to the cathode *k1* and the anode *a2* of the double diode limiters V1 and V2 respectively by means of a coupling capacitor *c1* and a resistor *r1* having a high enough resistance value to attenuate the incoming signal sufficiently so as not to load the preceding amplifier (not shown). The anode *a1* of the tube V1 is grounded. The cathode *k2* of the tube V2 is connected by means of a coupling capacitor *c2* with a control electrode such as the grid *g4* of a triode vacuum tube V4 which is interconnected with a vacuum tube V3 to comprise a multivibrator as described in detail below. A network including the resistor *r2* and a parallel capacitor *c3* are connected between the cathode *k2* of the vacuum tube V2 and ground. The control electrode *g4* is also connected with a conventional "B" power supply (not shown) by means of a resistor *r3* which has a very high resistive value (in the order of 10 to 20 megohms). The anode *a4* of the tube V4 is connected to the power supply by means of a load resistor *r4*.

The cathode *k4* of the tube V4 and the cathode *k3* of the associated tube in the V3 of the multivibrator are connected to ground by a common cathode biasing resistor *r5*. The anode *a3* of the tube V3 is connected to the "B" power supply by means of a load resistor *r6*. In the absence of an input signal to the multivibrator the tube V3 is maintained nonconducting by means of a positive bias impressed upon its control electrode *g3* by means of a voltage divider consisting of the resistors *r7* and *r8* which are connected in series between the "B" power supply and ground. The control electrode *g4* of the tube V4 is coupled with the anode *a3* of the tube V3 by means of a capacitor *ct* which with the high value resistor comprises a circuit having a comparatively long time constant.

The anode *a4* of multivibrator tube V4 is coupled with the cathode *k5* of a diode vacuum tube V5 by means of a coupling capacitor *c4* the common terminal between the capacitor and the anode being connected to ground through a resistor *r9*. The anode *a5* of the diode V5 is connected to the control electrode *g6* of a vacuum tube V6. A network consisting of a capacitor *c6* and a resistor *r10* which are parallel connected between the common terminal of the anode *a5* and the control electrode *g6* and ground. The cathode *k6* of the tube V6 is connected to ground by means of a biasing resistor *r11*. The anode *a6* of the tube V6 is connected to the "B" power supply through the solenoid of a relay L1 which has a pair of normally closed contacts *s2* which are connected in the control circuit (not shown) of the motor driving the drum of a conventional facsimile recorder. The relay L1 also has a pair of normally open contacts *s1* whose function will be described hereinafter.

The anode *a4* of multivibrator tube V4 is also connected with the control electrode *g7* of a tube V7 by means of a coupling capacitor *c7* and the contacts of a switch *s3* so that the auxiliary pulses are also impressed upon the electrode *g7*. The contacts *s3* are driven by the cam *m* which is mechanically operated in synchronism with the drum of the facsimile recorder by the drive (not shown) therefor. The capacitor *c7* is also connected to ground by means of a resistor *r12*. The control electrode *g7* is also connected to ground by means of the long time constant circuit including the resistor *r13* and the capacitor *c8*. The cathode *k7* of the tube V7 is connected directly to ground so that the tube normally conducts. Direct potential is supplied from the "B" power supply to the anode *a7* of the tube V7 by means of a resistor *r14*.

The anode *a7* is also connected to the anode *a8* of a diode tube V8 by means of a coupling capacitor *c9*, the common terminal of the capacitor and anode being connected to ground by means of a resistor *r20*. The cathode *k8* of the diode V8 is connected to the control electrode *g9* of a vacuum tube V9 by means of a resistor *r15*. The common terminal of the cathode *k8* and the resistor *r15* is connected to ground by a long time constant network comprising the capacitor *c10* and a resistor *r16*. This terminal is also connected to the B+ supply by means of a coupling resistor *r17* and the above-mentioned normally open contacts *s1* of the relay L1. The cathode *k9* of the tube V9 is connected to ground by the cathode biasing resistor *r18* proportioned so that the tube is normally near the cut off. The anode *a9* is connected to the "B" power supply through the solenoid of a circuit interrupting device such as the relay L2 having normally closed contacts *s4*. The contacts *s4* are connected in an actuating circuit for the framing device (not shown) in series with contacts *s5* operated by a cam *n*, a solenoid L5 for operating the framing device and the terminals *d* and *c* of a direct power supply.

The operation of the above described circuit can be best understood with reference to the diagrams which represent voltages with respect to ground plotted as a function of time and taken at various points in the wiring circuit. These diagrams are distinguished by roman numerals which are correlated with similar numerals upon the wiring diagram to indicate the points in the circuit which are correlated with the respective voltage-time diagrams. For purposes of illustration an input wave form such as shown in diagram I is assumed to be applied to the input terminals *t1* and *t2*. This input signal is a typical facsimile signal such as is received from the transmitting scanner and comprises a series of square framing pulses, the message portion of the signal being interposed in the portion of the cycle between adjacent pulses. Upon being received the signal is first amplified and then impressed both upon the facsimile recorder and upon the terminals *t1* and *t2*. To prevent overloading of the amplifying equipment the signal is attenuated by the resistor *r1* and any D. C. component eliminated by the coupling capacitor *c1*. The output of capacitor has an average or zero value with positive and negative components as shown. The negative components are removed by the diode V, while the diode V2 transmits the positive components. This signal is modified by the time constant of capacitor $c3$ and resistor $r4$ so that the voltage impressed upon coupling capacitor $c2$, capacitor $ct$ and the control electrode $g4$ varies as is shown in diagram II. Upon the impressing of a positive framing pulse upon the control electrode $g4$, as described above, the tube V4 continues to conduct for a period determined by the duration of this pulse with grid $g4$ at cathode potential. At the end of the positive pulse the grid $g4$ is driven negative blocking the tube V4. This causes a rise of potential at the anode $a4$ for a period which is equal in length to the time of discharge of the capacitor $ct$ through resistor $r3$. When the potential of the grid $g4$ again rises towards zero potential it is driven positive by the next framing pulse. This is illustrated graphically in diagram III. Diagram IV shows the voltage at anode $a4$ wherein the negative auxiliary pulses are formed in synchronism with the rate of occurrence of the input framing pulses.

The auxiliary pulses are impressed upon the control electrode $g6$ of the amplifier tube V6 by means of the coupling capacitor $c4$ and the diode V5, the diode insuring that any positive over shoot or "kick" is eliminated. The relatively long time constant of the circuit including the capacitor $c6$ filters the pulses so that a substantially constant negative potential such as shown in diagram V is impressed upon the control electrode $g6$. With this negative potential upon the control electrode $g6$ the tube V6 is cut off and the solenoid of the relay L1 is not energized so that the normally closed contacts $s2$ energize the motor control circuit.

The auxiliary pulses from the tube V4 of the multivibrator are also impressed upon the control electrodes $g7$ of the tube V7 by means of a circuit including the capacitor $c7$ and the switch $s3$ which is operated by the cam $m$ driven by the motor operating the drum of the facsimile recorder so that the closing of the contacts occurs at a definite selected point in the rotation of the drum. The auxiliary pulses are attenuated by the time constant of the circuit comprising the capacitor $c7$ and the resistor $r12$ into a series of sharp negative peaks such as is shown in diagram VI. When the drum of the receiver is in the proper phase relation to the scanner drum of the transmitter, the closing of the switch $s3$ by the cam $m$ coincides with the occurrence of the attenuated auxiliary pulse so that this pulse is impressed upon the network comprising the capacitor $c8$ and the resistor $r13$ which has a time constant of sufficient length to impress a substantially constant negative potential upon the control electrode $g7$ such as is shown in diagram VII. As each negative pulse is applied to the control electrode $g7$ of the tube V7 the tube is cut off so that the potential rises upon the anode $a7$. These pulses are applied to the control electrode $g9$ of the tube V9 by means of the capacitor $c9$ and the diode V8 which is used to eliminate negative over shoots.

The positive potential pulses are bridged by means of the network including the capacitor $c10$ and the resistor $r16$ so that the potential upon the control electrode $g9$ is substantially constant as is shown in diagram VIII. The positive potential on the control electrode $g9$ causes the tube V9 to conduct so that the solenoid of the relay L2 is energized to open the contacts $s4$ thereby to interrupt the actuating circuit of the solenoid L$s$ of the framing device so that when the picture is framed as is indicated by the coinciding of the closing of the switch contact $s3$ and the auxiliary pulses, the framing device is rendered inoperative. If the closing of the switch contact $s3$ does not coincide with the pulses no positive potential is applied to the control electrode $g9$ which is biased negatively by the potential drop across the resistor $r18$ so that the tube no longer conducts and the contacts $s4$ again close. This prepares the actuating circuit so that with each closing of the contacts $s5$ by means of the cam $m$, which is operated periodically preferably by the rotation of the facsimile recorder drum, the solenoid L$s$ is energized thereby to cause a change in angular relationship between the drum and its driving motor.

It will be evident from the above that the lack of framing pulses resulting from breakdown or stopping of the apparatus will also cause the relay L2 to be deenergized so that switch $s4$ is closed, whereby the solenoid L$s$ will be energized, if the contacts $s5$ happen to be closed at the stopping of the apparatus. To prevent this a positive bias is also placed upon the control electrode $g9$ by the closing of the contacts $s1$ of the relay L1. This occurs on stoppage of apparatus by the energization of the relay L1 which takes place when the signals stop and the contacts $s2$ controlling the drum motor circuit are opened.

It should be understood that the present disclosure is for the purpose of illustration only and that this invention includes all modifications and equivalents which fall within the scope of the appended claims.

I claim:

1. An electrical circuit for operating phase control apparatus such as the framing device for the moving electrode of a facsimile recorder in response to framing pulses in an input signal, comprising actuating means for the framing device, a generator of auxiliary pulses, circuit means for applying the framing pulses to the generator to synchronize the period of the auxiliary pulses therewith, and a network including switching means operated in synchronism with the movement of the electrode for applying the auxiliary pulses to the actuating means when the successive operations of the switching means coincide with the auxiliary pulses from the generator, thereby to render the framing device inoperative.

2. An electrical circuit for operating phase control apparatus such as the framing device for the motor operated drum of a facsimile recorder in response to framing pulses in an input signal, comprising actuating means for the framing device, a generator of auxiliary pulses, circuit means for applying the framing pulses to the generator to synchronize the period of the auxiliary pulses therewith, a control circuit connected to the generator to energize the drum motor in response to the presence of the auxiliary pulses, and a network including switching means operated in synchronism with the rotation of the drum for applying the auxiliary pulses to the actuating means when the successive operations of the switching means coincide with the auxiliary pulses from the generator, thereby to render the framing device inoperative, said network also being interconnected with the motor control circuit to render the framing device inoperative when the absence of auxiliary pulses results in deenergization of the drum motor.

3. An electrical circuit for operating phase control apparatus such as the framing device for the moving electrode of a facsimile recorder in response to framing pulses in an input signal, comprising actuating means for the framing device, a generator of auxiliary pulses, circuit means for applying the framing pulses to the generator to synchronize the period of the auxiliary pulses therewith, and a network including switching means operated in synchronism with the movement of the electrode for applying the auxiliary pulses to the actuating means, the time constant of the network being long enough to impress a substantially constant potential thereupon when the successive operations of the switching means coincide with the auxiliary pulses from the generator, thereby to render the framing device inoperative.

4. An electrical circuit for operating phase control apparatus such as the framing device for the motor operated drum of a facsimile recorder in response to framing pulses in an input signal, comprising actuating means for the framing device, a generator of auxiliary pulses, circuit means for applying the framing pulses to the generator to synchronize the period of the auxiliary pulses therewith, a control circuit connected to the generator to energize the drum motor in response to the presence of the auxiliary pulses, and a network including switching means operated in synchronism with the rotation of the drum for applying the auxiliary pulses to the actuating means, the time constant of the network being long enough to impress a substantially constant potential thereupon when the successive operations of the switching means coincide with the auxiliary pulses from the generator, thereby to render the framing device inoperative, said network also being interconnected with the motor control circuit to render the framing device inoperative when the absence of auxiliary pulses results in deenergization of the drum motor.

5. An electrical circuit for operating phase control apparatus such as the framing device for the drum of a facsimile recorder in response to framing pulses in an input signal, comprising an actuating circuit for the framing device including a vacuum tube having a control electrode and an anode and a circuit interrupting device connected with said anode, a generator of auxiliary pulses, circuit means for applying the framing pulses to the generator to synchronize the period of the auxiliary pulses therewith, and a network including switching means operated in synchonism with the rotation of the drum for applying the auxiliary pulses to the control electrode of the tube, the time constant of the network being long enough to impress a substantially constant potential thereupon when the successive operations of the switching means coincide with the auxiliary pulses from the generator, thereby to operate the relay rendering the framing device inoperative.

6. An electrical circuit for operating phase control apparatus such as the framing device for the motor operated drum of a facsimile recorder in response to framing pulses in an input signal, comprising an actuating circuit for the framing device including a vacuum tube having a control electrode and an anode and a circuit interrupting device connected with said anode, a generator of auxiliary pulses, circuit means for applying the framing pulses to the generator to synchronize the period of the auxiliary pulses therewith, a control circuit connected to the generator to energize the drum motor in response to the presence of the auxiliary pulses, and a network including switching means operated in synchronism with the rotation of the drum for applying the auxiliary pulses to the control electrode of the tube, the time constant of the network being long enough to impress a substantially constant potential thereupon when the successive operations of the switching means coincide with the auxiliary pulses from the generator, thereby to operate the relay rendering the framing device inoperative, said control electrode also being interconnected with the motor control circuit to bias the tube so that the framing device is inoperative when the absence of auxiliary pulses results in deenergization of the drum motor.

7. An electrical circuit for operating phase control apparatus such as the framing device for the drum of a facsimile recorder in response to framing pulses in an input signal, comprising actuating means for the framing device, a one-shot multivibrator for generating auxiliary pulses, circuit means for applying the framing pulses to the multivibrator to synchronize the period of the auxiliary pulses therewith, and a network including switching means operated in synchronism with the rotation of the drum for applying the auxiliary pulses to the actuating means, the time constant of the network being long enough to impress a substantially constant potential thereupon when the successive operations of the switching means coincide with the auxiliary pulses from the multivibrator, thereby to render the framing device inoperative.

8. An electrical circuit for operating phase control apparatus such as the framing device for the drum of a facsimile recorder in response to framing pulses in an input signal, comprising an actuating circuit for operating the framing device to bring the drum into proper phase relationship, which actuating circuit includes a circuit interrupting device for stopping the operation of the framing device, a one-shot multivibrator for generating auxiliary pulses, circuit means for applying the framing pulses to the multivibrator to synchronize the period of the auxiliary pulses therewith, and a network including switching means operated in synchronism with the rotation of the drum for applying the auxiliary pulses to the circuit interrupting device, the time constant of the network being long enough to impress a substantially constant potential thereupon when the successive closings of the switch coincide with the auxiliary pulses from the multivibrator, thereby to render the framing device inoperative.

9. An electrical circuit for operating phase control apparatus such as the solenoid for the step coupling interposed between the driving motor and the drum of a facsimile recorder in response to framing pulses in an input signal, comprising an actuating circuit including a first switch operated periodically to energize the solenoid to change the angular relationship between the drum and motor, and a circuit interrupting device for opening the actuating circuit to deenergize the solenoid irrespective of the position of the switch, a one-shot multivibrator for generating auxiliary pulses, circuit means for applying the framing pulses to the multivibrator to synchronize the period of the auxiliary pulses therewith, and a network including a second switch operated in synchronism with the rotation of the drum for applying the auxiliary pulses to the circuit interrupting device, the time constant of the network being long enough to impress a substantially constant potential thereupon when the successive closings of the second switch coincide with the auxiliary pulses from the multivibrator, thereby to deenergize the solenoid to render the step coupling inoperative.

10. An electrical circuit for operating phase control apparatus such as the framing device for the drum of a facsimile recorder in response to framing pulses in an input signal, comprising actuating means for the framing device, a multivibrator for generating auxiliary pulses including two vacuum tubes each having an anode, a cathode and a control electrode, a common biasing resistor connecting the cathodes of both tubes to ground, and a circuit having a capacitor connecting the anode of one of the tubes with the control electrode of the second tube, circuit means for applying the framing pulses to the control electrode of the second tube so that the tube conducts for a period determined by the time constant of the capacitor and associated circuit, and a network connected to the anode of the second tube and including switching means operated in synchronism with the rotation of the drum for applying the auxiliary pulses from the anode to the actuating means, the time constant of the network being long enough to impress a substantially constant potential thereupon when the successive operations of the switching means coincide with the auxiliary pulses from the multivibrator, thereby to render the framing device inoperative.

11. An electrical circuit for operating phase control apparatus such as the framing device for the drum of a facsimile recorder in response to framing pulses in an input signal, comprising an actuating circuit for operating the framing device to bring the drum into proper phase relationship, which actuating circuit includes a circuit interrupting device for stopping the operation of the framing device, a multivibrator for generating auxiliary pulses including two vacuum tubes, each having an anode, a cathode and a control electrode, a common biasing resistor connecting the cathodes of both tubes to ground, and a circuit having a capacitor connecting the anode of one of the tubes with the control electrode of the second tube, circuit means for applying the framing pulses to the control electrode of the second tube so that the tube conducts for a period determined by the time constant of the capacitor and associated circuit, and a network connected to the anode of the second tube and including switching means operated in synchronism with the rotation of the drum for applying the auxiliary pulses from the anode to the circuit interrupting device, the time constant of the network being long enough to impress a substantially constant potential thereupon when the successive closings of the switch coincide with the auxiliary pulses from the multivibrator, thereby to render the framing device inoperative.

12. An electrical circuit for operating phase control apparatus such as the solenoid for the step coupling interposed between the driving motor and the drum of a facsimile recorder in response to framing pulses in an input signal comprising an actuating circuit including a first switch operated periodically to energize the solenoid to change the angular relationship between the drum and motor and a circuit interrupting device, a multivibrator for generating auxiliary pulses including two vacuum tubes each having an anode, a cathode and a control electrode, a common biasing resistor connecting the cathode of both tubes to ground, and a circuit having a capacitor connecting the anode of one of the tubes with the control electrode of the second tube, circuit means for applying the framing pulses to the control electrode of the second tube so that the tube conducts for a period determined by the time constant of the capacitor and associated circuit, and a network connected to the anode of the second tube and including a second switch operated in synchronism with the rotation of the drum for applying the auxiliary pulses from the anode to the circuit interrupting device, the time constant of the network being long enough to impress a substantially constant potential thereupon when the successive closings of the second switch coincide with the auxiliary pulses from the multivibrator thereby to render the solenoid inoperative.

13. An electrical circuit for operating phase control apparatus such as the framing device for the motor operated drum of a facsimile recorder in response to framing pulses in an input signal comprising actuating means for the framing device, a multivibrator for generating auxiliary pulses including two vacuum tubes each having an anode, a cathode and a control electrode, a common biasing resistor connecting the cathodes of both tubes to ground, and a circuit having a capacitor connecting the anode of one of the tubes with the control electrode of the second tube, circuit means for applying the input signal to the control electrode of the second tube so that the tube conducts for a period determined by the time constant of the capacitor and associated circuit, a control circuit connected to the anode of the second tube to energize the drum motor in response to the auxiliary pulses, and a network connected to the anode of the second cut off tube and including switching means operated in synchronism with the rotation of the drum for applying the auxiliary pulses from the anode to the actuating means, the time constant of the network being long enough to impress a substantially constant potential thereupon when the successive closings of the switch coincide with the auxiliary pulses from the multivibrator thereby to render the framing device inoperative, said network also being interconnected with the motor control circuit to render the actuating means inoperative when the absence of auxiliary pulses results in deenergization of the drum motor.

14. An electrical circuit for operating phase control apparatus such as the framing device for the motor operated drum of a facsimile recorder in response to framing pulses in an input signal comprising an actuating circuit for operating the framing device to bring the drum into proper phase relationship which actuating circuit includes a circuit interrupting device for stopping the operation of the framing device, a multivibrator for generating auxiliary pulses including two vacuum tubes each having an anode, a cathode and a control electrode, a common biasing resistor connecting the cathodes of both tubes to ground, and a circuit having a capacitor connecting the anode of one of the tubes with the control electrode of the second tube, circuit means for applying the framing pulses to the control electrode of the second tube so that the tube conducts for a period determined by the time constant of the capacitor and associated circuit, a control circuit connected to the anode of the second tube to energize the drum motor in response to the auxiliary pulses, and a network connected to the anode of the second tube and including switching means operated in synchronism with the rotation of the drum for applying the auxiliary pulses from the anode to the circuit interrupting device, the time constant of the network being long enough to impress a substantially constant potential thereupon when the successive closings of the switch coincide with the auxiliary pulses from the multivibrator thereby to render the framing device inoperative, said network also being interconnected with the motor control circuit to render the framing device inoperative when the absence of auxiliary pulses results in deenergization of the drum motor.

ALEXANDER NYMAN.

REFERENCES CITED

The following references are of record in the file of this patent:

UNITED STATES PATENTS

| Number | Name | Date |
|---|---|---|
| 2,522,919 | Artzt | Sept. 19, 1950 |
| 2,556,970 | McFarlane | June 12, 1951 |